United States Patent
Namura et al.

(10) Patent No.: US 6,317,146 B1
(45) Date of Patent: Nov. 13, 2001

(54) IMAGE FORMING APPARATUS

(75) Inventors: Osamu Namura, Yokohama; Toshiyuki Ueno, Kawasaki, both of (JP)

(73) Assignee: Toshiba Tec Kabushiki Kaisha, Tokyo (JP)

(*) Notice: Subject to any disclaimer, the term of this patent is extended or adjusted under 35 U.S.C. 154(b) by 0 days.

(21) Appl. No.: 09/533,796

(22) Filed: Mar. 24, 2000

(51) Int. Cl.$^7$ .............................. B41J 2/385; G01D 15/06; G03G 15/01
(52) U.S. Cl. .............................. 347/116; 347/235
(58) Field of Search .................................... 347/115, 116, 347/117, 118, 233, 234, 235, 253, 257; 250/235

(56) References Cited

U.S. PATENT DOCUMENTS

| | | | |
|---|---|---|---|
| 5,305,023 | * 4/1994 | Fukushige et al. | 347/116 |
| 5,883,385 | * 3/1999 | Takahashi et al. | 250/235 |
| 5,892,533 | * 4/1999 | Tanimoto et al. | 347/257 |
| 6,011,256 | * 1/2000 | Takada | 250/235 |
| 6,108,501 | * 8/2000 | Nagai | 399/116 |
| 6,154,292 | * 11/2000 | Motoi | 347/253 X |

\* cited by examiner

Primary Examiner—Sandra Brase
(74) Attorney, Agent, or Firm—Foley & Lardner

(57) ABSTRACT

In this invention, a precise multi-beam control process can be effected while suppressing an influence due to the drift of a galvanomirror by effecting the multi-beam position control process during the copying operation, that is, by repeatedly effecting the sub-scanning position control process and main scanning position control process. Therefore, an image can be prevented from being deviated at the front and rear end portions of one sheet of paper.

4 Claims, 9 Drawing Sheets

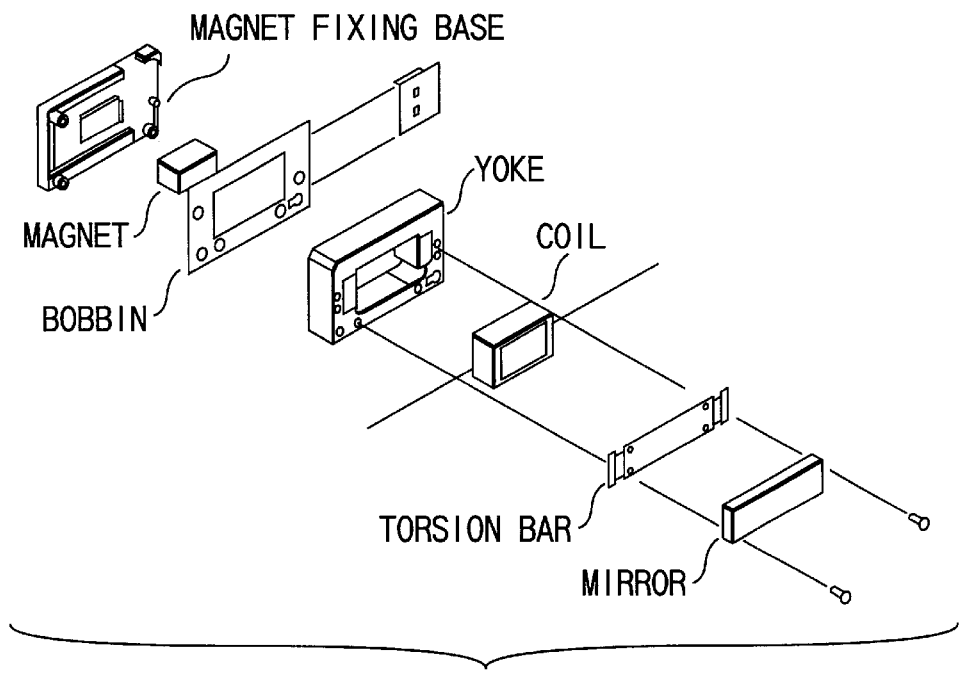
FIG. 1
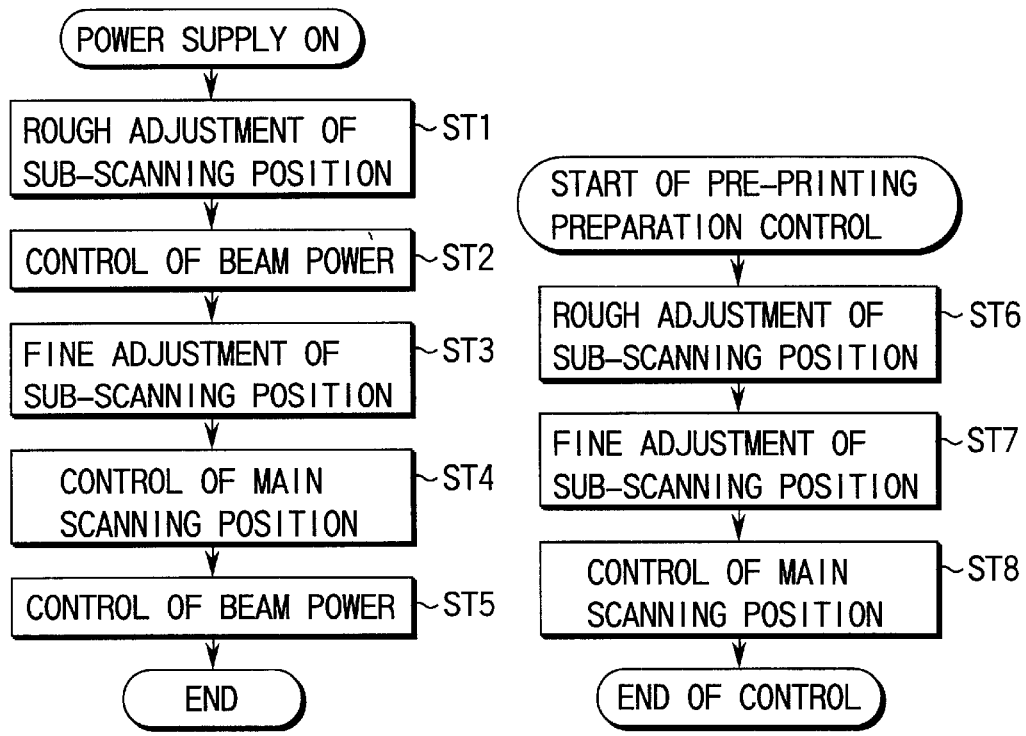
FIG. 2
FIG. 3

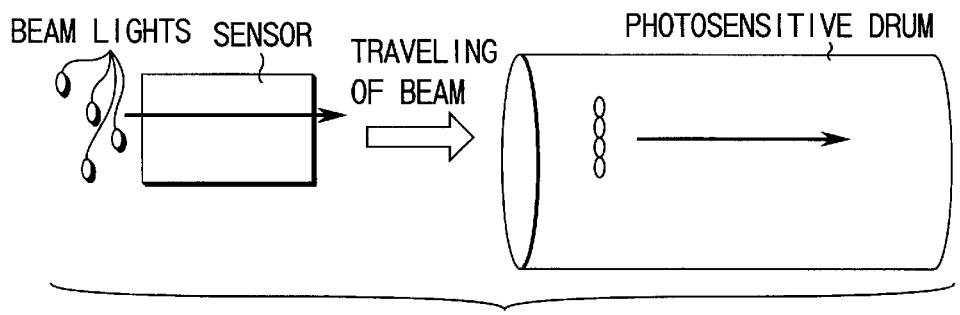

FIG. 8

UNIT: μm

| NO. | NUMBER OF BEAM LIGHT | POSITIONAL DEVIATION OF BEAM LIGHT WHEN TEMOERATURE OF SURROUNDING OF GALVANOMIRROR IS CHANGED FROM 30°C TO 40°C | |
|---|---|---|---|
| | | MAIN SCANNING DIRECTION | SUB-SCANNING DIRECTION |
| 1 | FIRST BEAM LIGHT (a) | 150 | 150 |
| | SECOND BEAM LIGHT (b) | 35 | 190 |
| | THIRD BEAM LIGHT (c) | 33 | 180 |
| | FOURTH BEAM LIGHT (d) | 34 | 180 |
| 2 | FIRST BEAM LIGHT (a) | −45 | −160 |
| | SECOND BEAM LIGHT (b) | −43 | −150 |
| | THIRD BEAM LIGHT (c) | −33 | −150 |
| | FOURTH BEAM LIGHT (d) | −36 | −160 |
| 3 | FIRST BEAM LIGHT (a) | −60 | −80 |
| | SECOND BEAM LIGHT (b) | −47 | −120 |
| | THIRD BEAM LIGHT (c) | −60 | −130 |
| | FOURTH BEAM LIGHT (d) | −64 | −150 |

*SIGN "+" IS INDICATED WHEN IMAGE SURFACE POSITION ON PHOTO-SENSITIVE DRUM MOVES TO RIGHT AND SIGN "−" IS INDICATED WHEN IT MOVES TO LEFT WHILE VALUE OBTAINED WHEN CONTROL PROCESS IS EFFECTED AT 30°C IS SET AS REFFERENCE POINT IN CASE OF MAIN SCANNING DIRECTION

*SIGN "+" IS INDICATED WHEN IMAGE SURFACE POSITION ON PHOTO-SENSITIVE DRUM MOVES TO UPWARDLY AND SIGN "−" IS INDICATED WHEN IT MOVES DOWNWARD WHILE VALUE OBTAINED WHEN CONTROL PROCESS IS EFFECTED AT 30°C IS SET AS REFFERENCE POINT IN CASE OF SUB-SCANNING DIRECTION

FIG. 9

| | MINIMUM | AVERAGE | MAXIMUM |
|---|---|---|---|
| IMAGE SURFACE MOVING DISTANCE FOR EACH STEP ($\mu$m/LSB) | 1.23 | 1.76 | 2.22 |
| DEFLECTION ANGLE FOR EACH STEP ($\mu$rad/LSB) | 6.22 | 8.92 | 11.23 |

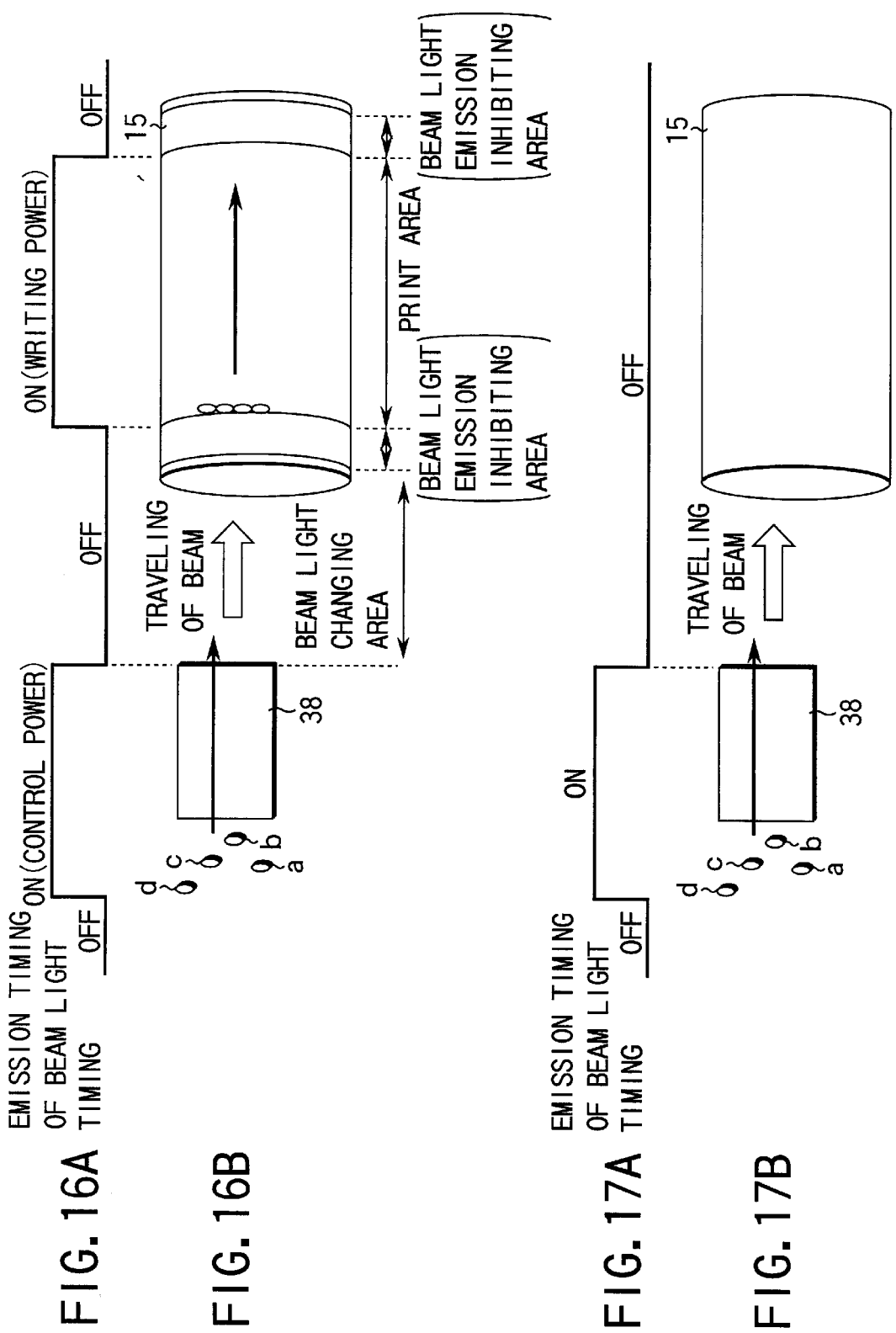

IMAGE FORMING APPARATUS

BACKGROUND OF THE INVENTION

This invention relates to an image forming apparatus such as a digital copying machine or laser printer using a beam light scanning device, for example, for simultaneously scanning and exposing a plurality of beam lights on a single photosensitive drum to form a single electrostatic latent image on the photosensitive drum.

Recently, for example, various types of digital copying machines for forming an image by effecting the electrophotographic process and the scanning and exposing process by use of beam lights have been developed.

Further, in recent years, in order to further enhance the image forming speed, a multi-beam type copying machine, that is, a digital copying machine for generating a plurality of beam lights and simultaneously scanning plural lines by use of the plurality of beam lights has been developed.

In the above multi-beam type copying machine, an optical system unit is provided as a beam light scanning device which includes a plurality of semiconductor laser oscillators (which are hereinafter referred to as laser oscillators) for generating beam lights, a polygonal rotating mirror such as a polygon mirror for reflecting the beam lights output from the plurality of laser oscillators to a photosensitive drum by use of galvanomirrors and scanning the reflected beam lights on the photosensitive drum, and collimator lens and f-θ lens as main components.

As an image forming apparatus having the above beam light scanning device, apparatuses are proposed in U.S. patent application Ser. No. 09/150,705 (Jpn. Pat. Appln. KOKAI Publication No. 11-95142, Japanese Patent Application No. 9-257351), U.S. patent application Ser. No. 09/439,088 (Japanese Patent Application No. 10-323872), U.S. patent application Ser. No. 09/470,884 (Japanese Patent Application No. 10-365611). In this proposal, the position control operation of each beam light and the light amount (power) control operation are effected based on a detection output from a beam light position detecting sensor. By the above control operations, the misalignment of images due to the positional deviation of the beam lights of an image and irregularity of the image due to a difference in the light amounts (powers) of the beam lights can be prevented.

As shown in FIG. 1, the galvanomirror is constructed by a magnet fixing base, magnet, bobbin, coil, torsion bar, and mirror.

In the galvanomirror, the mirror is moved in the sub-scanning direction by controlling the direction and amount of a current flowing in the coil to control the position of the beam light in the sub-scanning direction. This utilizes force caused between the coil and the magnet based on the Fleming's left-hand rule.

In the multi-beam control operation, a plurality of beam lights are not simultaneously controlled but the beam lights are sequentially controlled for each beam light. In this case, in order to omit a variation in the surface precision of a polygon motor for rotating the polygon mirror, the sub-scanning control operation is effected by use of an average value of the eight surfaces of the polygon mirror (corresponding to one rotation of the polygon mirror).

With the above apparatus, in order to compensate for a drift of the galvanomirror, the multi-beam control operation which is disclosed in U.S. patent application Ser. No. 09/470,884 (Japanese Patent Application No. 10-365611) is effected at the turn-ON time of the power supply, at the end of the printing process, in the READY state, and in a paper printing-paper printing time interval.

As shown in FIG. 2, at the turn-ON time of the power supply, the rough adjustment of the sub-scanning position (ST1), control of the beam power (ST2), fine adjustment of the sub-scanning position (ST3), control of the main scanning position (ST4), and control of the main power (ST5) are sequentially effected from the time immediately after the turn-ON of the power supply.

At the end of the printing process, the pre-printing preparation control is effected.

As shown in FIG. 3, in the pre-printing preparation control, the rough adjustment of the sub-scanning position (ST6), fine adjustment of the sub-scanning position (ST7) and control of the main scanning position (ST8) are sequentially effected.

That is, the rough adjustment of the sub-scanning position is first made and then the beam light is moved with large steps (100 steps≈a variation 176 μm in the image surface position) until the beam light comes onto the surface of the beam light position detecting sensor in order to move the beam light onto the beam light position detecting sensor. Next, the fine adjustment of the sub-scanning position is made to control the beam light which has been brought onto the surface of the beam light position detecting sensor by the rough adjustment and set the same within a to-be-controlled target range of ±2.7 μm. After this, control of the main scanning position is effected.

As shown in FIG. 4, as the control operation in the READY state, a sub-scanning control process (ST11, ST12) in the READY state for each of four beam lights and a control process (ST13, ST14) in the READY state for each of the four beam lights are sequentially effected. The sub-scanning control process in the READY state and the main scanning control process in the READY state are repeatedly effected until an instruction such as start of the printing process is issued (ST15).

After the printing process is started and when the printing process is terminated, the pre-printing preparation process (ST17) is effected.

That is, as shown in FIG. 5, in the sub-scanning control process in the READY state, a to-be-controlled beam light is first emitted (ST21), a specified value in the preceding cycle is given to the galvanomirror (ST22), whether or not the beam light lies within the target range of (±2.7 μm) is determined (ST23), and if it lies within the target range, no process is effected. If it does not lie in the target range, whether it lies above or below the target is determined (ST24), and it is moved by one step in a direction closer to the target (ST25, ST26). The control process is sequentially effected for each of four beam lights (from ST21 to ST27).

Next, as shown in FIG. 6, in the main scanning control process in the READY state, a beam light is emitted (ST31) with the previous specified value (corresponding to a dot value: one pixel (42.3 μm), tap value: approx. ¹⁄₁₀ dot (approx. 42.3 μm), whether the sensor response is obtained by eight times (corresponding to eight surfaces of the polygon mirror) or not is determined (ST32). If the response is obtained by eight times, the tap value is changed to reduce the time for emission of the beam light by one tap (ST33) and if the response is not obtained by eight times, the tap value is changed to increase the time for emission of the beam light by one tap (ST34). In a case where the response is not obtained by eight times even if the time for emission of the beam light is increased to a maximum value, an error is displayed on the main body (ST35). The control process is sequentially effected for each of four beam lights (from ST31 to ST36).

In the control process in the paper printing-paper printing time interval, as shown in FIG. 7, like the READY control process, a sub-scanning control process (ST41, ST42) for each of the four beam lights and a main scanning control process (ST43, ST44) for each of the four beam lights are effected.

The above control process is different from the READY control process in that the control operation is repeatedly effected in the READY control process until a specification such as start of printing is issued, but in the above control process, the control operation is effected only once.

During the printing process, as shown in FIG. 8, a deviation of each of the beam lights in the main scanning direction is corrected by use of the dot value and tap value to adjust the print start timing.

The galvanomirror moves the mirror in the sub-scanning direction by controlling the direction and amount of a current flowing in the coil so as to control the sub-scanning position of the beam light. This utilizes force caused between the coil and the magnet based on the Fleming's left-hand rule. By energizing the coil, heat is generated in the coil of the galvanomirror. Since the atmospheric temperature of the galvanomirror is changed due to heat generation in the coil by energization of the coil, the viscosity of a damping agent is changed and the magnitude of magnetic force of the magnetic circuit fluctuates, and a drift phenomenon that the mirror is rotated (shifted) in the sub-scanning direction occurs.

As shown in FIG. 9, the drift of the galvanomirror gives an influence not only on the sub-scanning direction but also on the main scanning direction, and it may cause a positional deviation in the main scanning direction by the same distance as in the sub-scanning direction at maximum. As shown in FIG. 1, this is because the galvanomirror moves not only in the vertical direction with respect to the sub-scanning direction but also in the oblique direction by distortion of the torsion bar of the galvanomirror. Further, this is due to the precision at the assembling time which is caused by mounting the mirror in an inclined state, for example. For this reason, it is necessary to take the influence by the drift of the galvanomirror into consideration also in the main scanning direction.

As shown in FIG. 10, there is a possibility that the beam light on the image surface (on the photosensitive drum) will be deviated by 50 $\mu$m at maximum from the reading position of the optical sensor in the sub-scanning direction for approx. one second (0.87 second) due to the drift of the galvanomirror by energization.

As described above, since the beam light on the image surface may be deviated in the main scanning direction by the same amount as in the sub-scanning direction by the influence of the drift of the galvanomirror by energization, there occurs a possibility that it will be deviated by 50 $\mu$m also in the main scanning direction.

To-be-controlled target ranges of the image surface in the main scanning direction and sub-scanning direction are respectively set within 10 $\mu$m in the main scanning direction and within ±2.7 $\mu$m in the sub-scanning direction. Therefore, the deviation of 50 $\mu$m in the main scanning direction and sub-scanning direction causes the beam light to be largely deviated from the to-be-controlled target range, thereby causing a possibility that a problem occurs in the image.

In order to prevent the above problem, the multi-beam control operation is effected at the turn-ON time of the power supply, at the end of the printing process, in the READY state, and in the paper printing-paper printing time interval.

However, during the printing process, since the printing process is effected based on the control result described before, neither the control operation in the sub-scanning direction nor the control operation in the main scanning direction is effected. In the control process in the paper printing-paper printing time interval at the time of printing, if the paper size is A3 or LD, the control process is effected at control intervals of one time for approx. two seconds in the main scanning direction and only the control operation of one tap: (approx. 1110 dots (approx. 4.2 $\mu$m) can be effected. Likewise, the control operation is effected at control intervals of one time for approx. two seconds also in the sub-scanning direction and only the control operation of one step=(approx. 2 $\mu$m) (FIG. 11) can be effected.

Therefore, if the deviation of 2.0 $\mu$m which is the limit of correction in the sub-scanning direction or more or 4.2 $\mu$m which is the limit of correction in the main scanning direction or more occurs due to the drift or the like, the position of the beam light cannot be controlled by the control process in the paper printing-paper printing time interval and there may occur a possibility that a problem occurs in the image.

Further, if a deviation larger than ±2.7 $\mu$m which is the to-be-controlled target range in the sub-scanning direction occurs or if a deviation larger than 4.2 $\mu$m which is the to-be-controlled target range in the main scanning direction occurs, a possibility that a problem occurs in the image at the rear end of paper may occur. For this reason, it is required to effect the control process in the sub-scanning direction and the control process in the main scanning direction during the printing process.

BRIEF SUMMARY OF THE INVENTION

An object of this invention is to provide an image forming apparatus capable of effecting the control process in the sub-scanning direction and the control process in the main scanning direction during the image forming operation and preventing an image from being deviated in the middle portion of an image forming medium.

The above object can be attained by an image forming apparatus for forming an image of one image forming medium on an image carrier by scanning and exposing the image carrier by use of a plurality of beam lights, comprising a plurality of beam light generating means for outputting a plurality of beam lights; deflecting means for deflecting the plurality of beam lights emitted from the plurality of beam light generating means; scanning means for reflecting the plurality of beam lights deflected by the deflecting means towards the image carrier to scan the plurality of beam lights on the image carrier; beam light detecting means disposed near a to-be-scanned position on the image carrier, for outputting a detection signal corresponding to timing in the scanning direction of each beam light scanned by the scanning means and a detection signal corresponding to a position of each beam light in a direction perpendicular to the scanning direction; and adjusting means for adjusting the timing in the scanning direction of each beam light scanned by the scanning means and the position each beam light in the direction perpendicular to the scanning direction based on the detection signals obtained by the beam light detecting means in a case where the beam light detecting means is scanned by the scanning means when an image of one image forming medium is formed on the image carrier.

Further, this invention provides an image forming apparatus for forming an image of one image forming medium on an image carrier by scanning and exposing the image carrier by use of a plurality of beam lights, comprising a plurality of beam light generating means for outputting a plurality of beam lights at a first power level for controlling and at a second power level for writing; deflecting means for deflecting the plurality of beam lights emitted from the plurality of beam light generating means; scanning means for reflecting the plurality of beam lights deflected by the deflecting means towards the image carrier to scan the plurality of beam lights on the image carrier; beam light detecting means disposed near a to-be-scanned position on the image carrier, for outputting a detection signal corresponding to timing in the scanning direction of each beam light scanned by the scanning means, a detection signal corresponding to the power of each beam light and a detection signal corresponding to a position each beam light in a direction perpendicular to the scanning direction; adjusting means for emitting each beam light at the first power level and deriving a horizontal sync. signal from the beam light detecting means when the beam light detecting means is scanned by the scanning means, emitting only a to-be-controlled beam light and adjusting the position of the to-be-controlled beam light in a direction perpendicular to the scanning direction or the timing of the to-be-controlled beam light in the scanning direction according to the horizontal sync. signal and detection signals derived from the beam light detecting means; and image forming means for emitting beam lights at the second power level according to an image to be formed when the image carrier is scanned by the scanning means after the adjustment by the adjusting means, scanning and exposing the image carrier to form an image on the image carrier.

Further, this invention provides an image forming apparatus for forming an image of one image forming medium on an image carrier by scanning and exposing the image carrier by use of a plurality of beam lights, comprising a plurality of beam light generating means for outputting a plurality of beam lights at a first power level for controlling and at a second power level for writing; deflecting means for deflecting the plurality of beam lights emitted from the plurality of beam light generating means; scanning means for reflecting the plurality of beam lights deflected by the deflecting means towards the image carrier to scan the plurality of beam lights on the image carrier; beam light detecting means disposed near a to-be-scanned position on the image carrier, for outputting a detection signal corresponding to timing in the scanning direction of each beam light scanned by the scanning means, a detection signal corresponding to the power of each beam light and a detection signal corresponding to a position of each beam light in a direction perpendicular to the scanning direction; first adjusting means for emitting each beam light at the first power level and deriving a horizontal sync. signal from the beam light detecting means when the beam light detecting means is scanned by the scanning means, emitting only a to-be-controlled beam light and adjusting the position of the to-be-controlled beam light in a direction perpendicular to the scanning direction thereof according to the horizontal sync. signal and detection signals derived from the beam light detecting means; second adjusting means for emitting each beam light at the first power level and deriving a horizontal sync. signal from the beam light detecting means when the beam light detecting means is scanned by the scanning means, emitting only a to-be-controlled beam light and adjusting the timing of the to-be-controlled beam light in the scanning direction thereof according to the horizontal sync. signal and detection signals derived from the beam light detecting means; and image forming means for emitting beam lights at the second power level according to an image to be formed when the image carrier is scanned by the scanning means after the adjustment by the first or second adjusting means, scanning and exposing the image carrier to form an image on the image carrier.

BRIEF DESCRIPTION OF THE SEVERAL VIEWS OF THE DRAWING

FIG. 1 is a construction view of a galvanomirror;

FIG. 2 is a flowchart for illustrating the multi-beam control process at the turn-ON time of the power supply;

FIG. 3 is a flowchart for illustrating the pre-printing preparation control process;

FIG. 8 is a view for illustrating the correction process for deviation of each beam light in the main scanning direction during printing;

FIG. 9 is a diagram for illustrating the positional deviation of the drift in the sub-scanning direction and main scanning direction due to a difference in the temperature of the surrounding of the galvanomirror;

FIGS. 16A, 16B are views for illustrating the timing of emission of beam lights at the time of printing; and FIGS. 17A, 17B are views for illustrating the timing of emission of beam lights in the READY state.

DETAILED DESCRIPTION OF THE INVENTION

There will now be described an image forming apparatus according to an embodiment of this invention with reference to the accompanying drawings.

The image forming apparatus is an apparatus such as a digital copying machine or a laser printer using a beam light scanning device for simultaneously scanning and exposing a single photosensitive drum by use of a plurality of beam lights to form a single electrostatic latent image on the photosensitive drum. In the image forming apparatus, an electrostatic latent image formed on the photosensitive drum is transferred on a sheet of paper of fixed size as an image forming medium after the latent image is developed by a developing unit.

Figure 12:
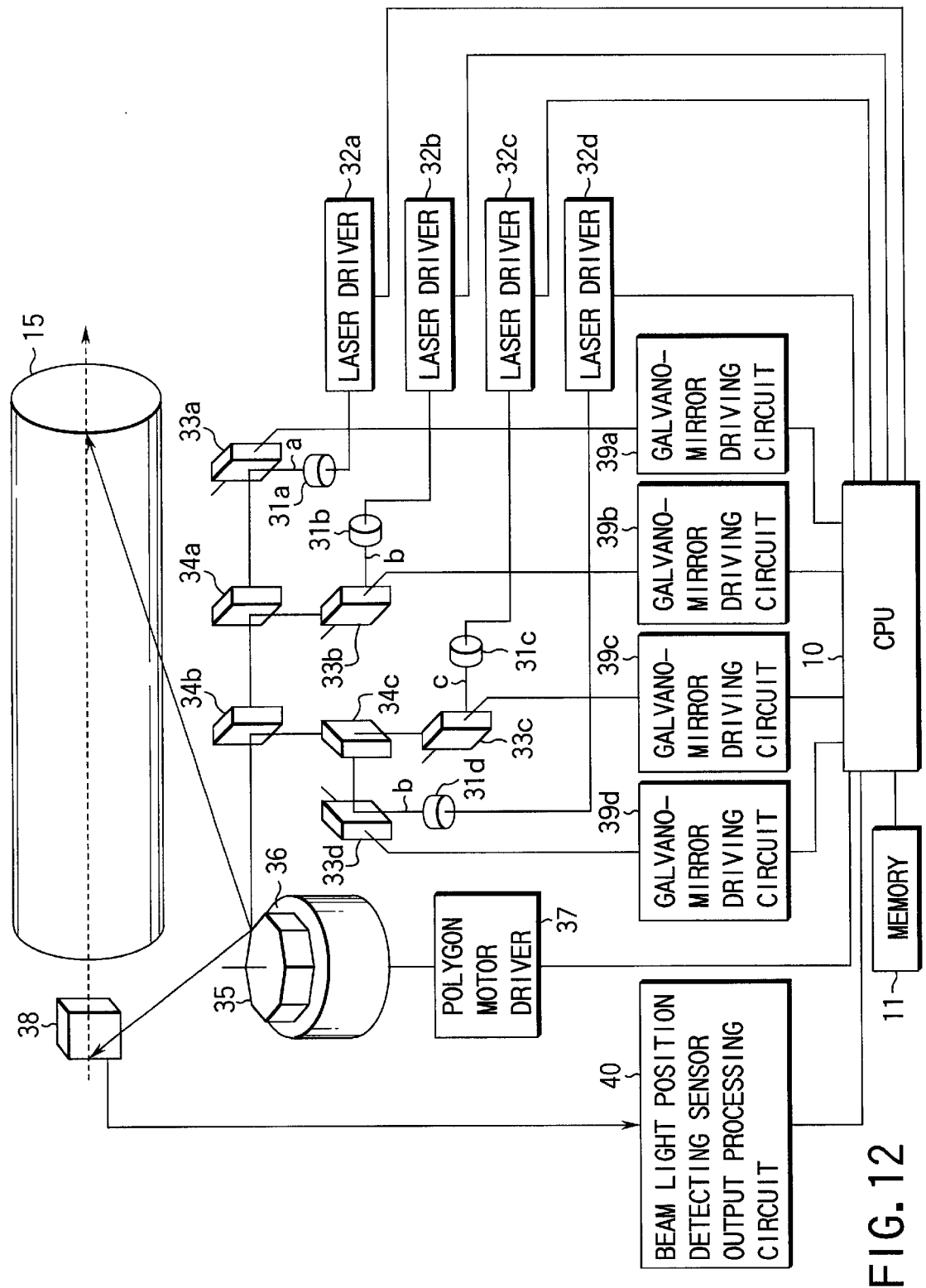
FIG. 12 is a view showing the construction of an optical system unit used in a digital copying machine as an image forming apparatus according to one embodiment of this invention and the positional relation thereof with respect to a photosensitive drum.

FIG. 12 shows the construction of an optical system unit 13 used in a digital copying machine as an image forming apparatus of this invention and the positional relation thereof with respect to a photosensitive drum 15 used as an image carrier.

The optical system unit 13 contains four semiconductor laser oscillators (which are hereinafter referred to as laser oscillators) 31a, 31b, 31c, 31d, for example. The high-speed image forming process can be attained without extremely increasing the rotation speed of a polygon mirror 35 by simultaneously scanning lines by respectively using beam lights a to d emitted from the laser oscillators 31a to 31d to form an image.

That is, the laser oscillator 31a is driven by a laser driver 32a. The beam light a emitted from the laser oscillator 3a is made incident on a galvanomirror 33a as optical path changing means after passing through a collimator lens (not shown). The beam light a reflected from the galvanomirror 33a passes through half mirrors 34a, 34b and is made incident on a polygon mirror 35 as a polygonal rotating mirror.

The polygon mirror 35 is rotated at a constant speed by a polygon motor 36 which is driven by a polygon motor driver 37. Therefore, the light reflected from the polygon mirror 35 is scanned in a preset direction at an angular speed determined by the rotation speed of the polygon motor 36. The beam light a scanning by the polygon mirror 35 passes through an f-θ lens (not shown) to scan the light receiving surface of a beam light position detecting sensor 38 as beam light position detecting means and the photo-sensitive drum 15 at a constant speed according to the f-θ characteristic of the f-θ lens.

The laser oscillator 31b is driven by a laser driver 32b. The beam light b emitted from the laser oscillator 31b is reflected from a galvanomirror 33b after passing through a collimator lens (not shown) and is then reflected from the half mirror 34a. The beam light reflected from the half mirror 34a passes through the half mirror 34b and is made incident on the polygon mirror 35. Like the beam light a emitted from the laser oscillator 31a, the beam light b scanned by the polygon mirror 35 passes through the f-θ lens (not shown) to scan the light receiving surface of the beam light position detecting sensor 38 and the photosensitive drum 15 at a constant speed.

The laser oscillator 31c is driven by a laser driver 32c. The beam light c emitted from the laser oscillator 31c is reflected from a galvanomirror 33c after passing through a collimator lens (not shown), then passes through a half mirror 34c, is reflected from the half mirror 34b and is made incident on the polygon mirror 35. Like the beam lights a, b emitted from the laser oscillators 31a, 31b, the beam light c scanned by the polygon mirror 35 passes through the f-θ lens (not shown) to scan the light receiving surface of the beam light position detecting sensor 38 and the photosensitive drum 15 at a constant speed.

The laser oscillator 31d is driven by a laser driver 32d. The beam light d emitted from the laser oscillator 31d is reflected from a galvanomirror 33d after passing through a collimator lens (not shown), then reflected from the half mirror 34c, reflected from the half mirror 34b and made incident on the polygon mirror 35. Like the beam lights a, b, c emitted from the laser oscillators 31a, 31b, 31c, the beam light d scanned by the polygon mirror 35 passes through the f-θ lens (not shown) to scan the light receiving surface of the beam light position detecting sensor 38 and the photosensitive drum 15 at a constant speed.

Thus, the beam lights a, b, c, d emitted from the different laser oscillators 31a, 31b, 31c, 31d are combined by the half mirrors 34a, 34b, 34c and the four beam lights a to d travel towards the polygon mirror 35.

Therefore, the four beam lights a to d can simultaneously scan the photosensitive drum 15, thereby making it possible to record an image at a speed which is four times that of the conventional single beam case if the rotation speed of the polygon mirror 35 is kept unchanged.

The galvanomirrors 33a, 33b, 33c, 33d are used for adjusting (controlling) the positional relation between the beam lights in the sub-scanning direction. To the galvanomirrors 33a, 33b, 33c, 33d, galvanomirror driving circuits 39a, 39b, 39c, 39d for driving the respective galvanomirrors are connected.

The beam light position detecting sensor 38 is used for detecting the passage position and passage timing of the four beam lights a to d. The beam light position detecting sensor 38 is disposed near the end portion of the photosensitive drum 15 so that the light receiving surface of the beam light position detecting sensor 38 will be equivalent to the surface of the photosensitive drum 15 (virtual distances thereof from the polygon mirror 35 will be equal to each other).

Thus, the beam lights a to d transmitted from the polygon mirror 35 through the f-θ lens to scan the surface of the photosensitive drum 15 are equivalent to the beam lights a to d used for scanning the light receiving surface of the beam light position detecting sensor 38.

Next, the beam light position detecting sensor 38 is explained.

Figure 13:
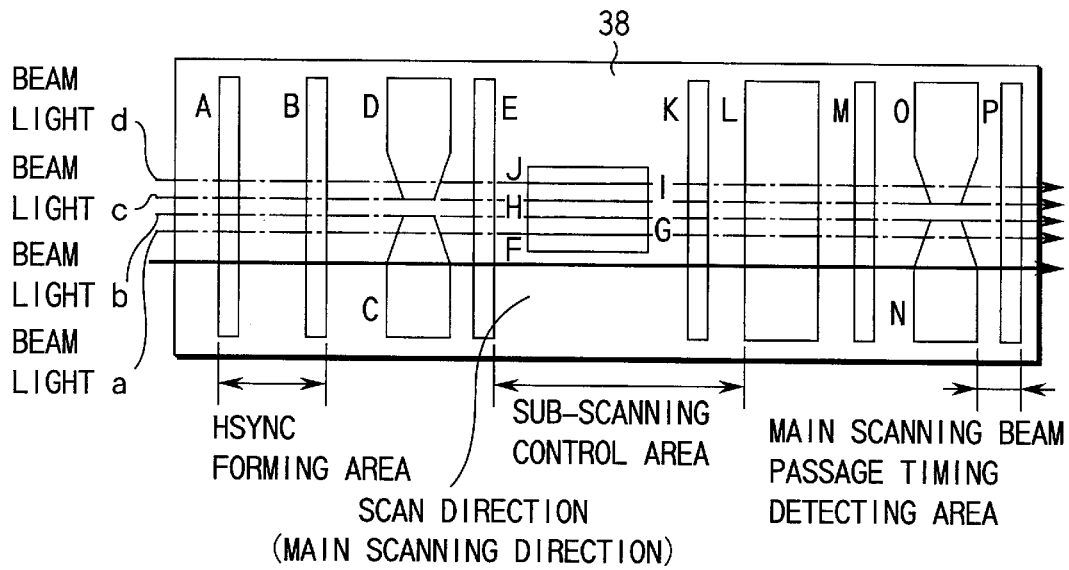
FIG. 13 is a view showing the structure of a beam light position detecting sensor and the relation thereof with respect to the scanning direction of the beam lights.

FIG. 13 shows the structure of the beam light position detecting sensor 38 and the relation thereof with respect to in the scanning direction of the beam lights a to d. The beam lights a to d from the four semiconductor laser oscillators 31a, 31b, 31c, 31d are scanned in a direction from the left to the right in the drawing by rotation of the polygon mirror 35 to cross the beam light position detecting sensor 38.

The beam light position detecting sensor 38 includes sensors A, B, E, K, L, M, P which are long in the vertical direction, trapezoidal sensors C, D arranged between the sensors B and E, sensors F, G, H, I, J arranged between the sensors E and K, and trapezoidal sensors O, N arranged between the sensors M and P.

As shown in FIG. 13, the sensor patterns of the sensors A, B, E, K, L, M, P are made long in the vertical direction which is perpendicular to the scanning direction of the beam lights a to d so that the beam lights a to d scanned by the polygon mirror 35 can always cross them irrespective of the positions of the galvanomirrors 33a to 33d.

As shown in FIG. 13, the sensor patterns of the sensors C, D and the sensors O, N are so arranged that narrower portions of the trapezoids will be set on the central side of the beam light position detecting sensor 38 in a direction perpendicular to the scanning direction of the beam lights.

As shown in FIG. 13, the sensor patterns of the sensors F, G, H, I, J are so arranged as to be stacked on one another between the sensors E and K and small gaps are formed between the sensors F and G, sensors G and H, sensors H and I, and sensors I and J.

The scanning range from the left end of the sensor A to the right end of the sensor B is an HSYNC (horizontal sync.

signal) forming area, the scanning range from the right end of the sensor E to the left end of the sensor L is a sub-scanning control area and the scanning range from the right end of the sensor N to the right end of the sensor P is a main scanning beam passage timing detecting area.

A processing circuit 40 for processing a detection output from the beam light position detecting sensor 38 is connected to the beam light position detecting sensor 38.

For example, the processing circuit 40 includes first and second amplifiers, first to fourth differential amplifiers, selection circuit, integrator and A/D converter.

A CPU 10 controls the whole portion of the apparatus.

For example, the CPU 10 controls the laser drivers 32a, . . . , galvanomirror driving circuits 39a, 39b, 39c, 39d and the like. The CPU 10 is so designed as to control the laser drivers 32a, . . . , galvanomirror driving circuits 39a, 39b, 39c, 39d and the like according to the output from the processing circuit 40.

That is, the CPU 10 performs the following control operation based on the output of the processing circuit 40 or the detection signals from the beam light position detecting sensor 38.

The control operation for the galvanomirrors 33a, 33b, 33c, 33d for the beam lights a to d (the control operation of the image forming position in the sub-scanning direction), the control operation of the power (intensity) of the beam lights a to d of the laser oscillators 31a, 31b, 31c, 31d and the control operation of the light emission timing (the control operation of the image forming position in the main scanning direction) are performed.

A memory 11 is connected to the CPU 10. A control program is stored in the memory 11. The memory 11 stores a first control value corresponding to the power level of the beam lights a to d from the laser oscillators 31a, 31b, 31c, 31d when the position control is effected by use of the beam light position detecting sensor 38 and a second control value (which is a power target value for printing) corresponding to the power level of the beam lights a to d from the laser oscillators 31a, 31b, 31c, 31d when an electrostatic latent image is written (formed) on the photosensitive drum 15.

The power (second power) of the beam lights a to d on the photosensitive drum 15 used when an electro-static latent image is written (formed) on the photosensitive drum 15 is adjusted to be gradually increased with the deterioration with age of the photosensitive drum 15.

That is, the second control value corresponding to the power level of the beam lights a to d emitted from the laser oscillators 31a, 31b, 31c, 31d is adjusted by the serviceman in order to form a proper electrostatic latent image irrespective of the deterioration with age of the photosensitive drum 15.

The power (first power) of the beam lights a to d on the beam light position detecting sensor 38 used when the position control is effected by use of the beam light position detecting sensor 38 is kept set at the constant power (300 $\mu$W) irrespective of the deterioration with age of the photosensitive drum 15.

That is, the first power is kept unchanged at the constant power irrespective of the second power which varies according to the deterioration with age of the photosensitive drum 15.

Thus, since the detection output signal output from the beam light position detecting sensor 38 is kept unchanged, the control operation such as the precise position control operation can be effected.

The detail of the above construction is described in U.S. patent application Ser. No. 09/150,705.

Figure 14:
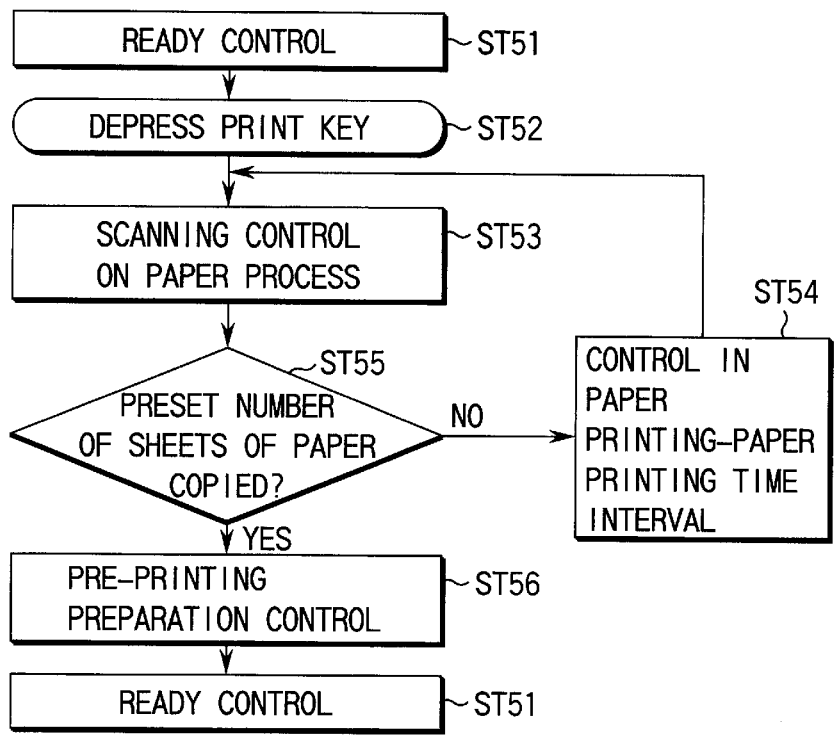
FIG. 14 is a flowchart for illustrating the position control process for beam lights during printing.

Next, with the above construction, the beam control process is explained with reference to the flowchart shown in FIG. 14.

The beam control process includes the READY control process (ST51) effected at the standby time before depression of the print key, the scanning control on paper process (ST53) effected for each sheet of paper after depression of the print key (ST52), the control process (ST54) effected in a paper printing-paper printing time interval, and the pre-printing preparation control process (ST56) effected at the end of printing (ST55).

That is, the multi-beam control operation in the copying process is effected by starting the scanning control on paper process (ST53) when the print key (ST52) is depressed after the READY control process (ST51) has been effected. After the end of copying, whether paper to be next copied is present or not is determined (ST55) and if paper to be next copied is present, the control process (ST54) in a paper printing-paper printing time interval is effected and then the next copying process is effected. If there is no paper to be copied, the pre-printing preparation control process (ST56) is effected and then the READY control process is effected.

Since the READY control process, the control process in a paper printing-paper printing time interval in the printing process and the pre-printing preparation control process are the same as explained before and the explanation therefor is omitted.

Figure 15:
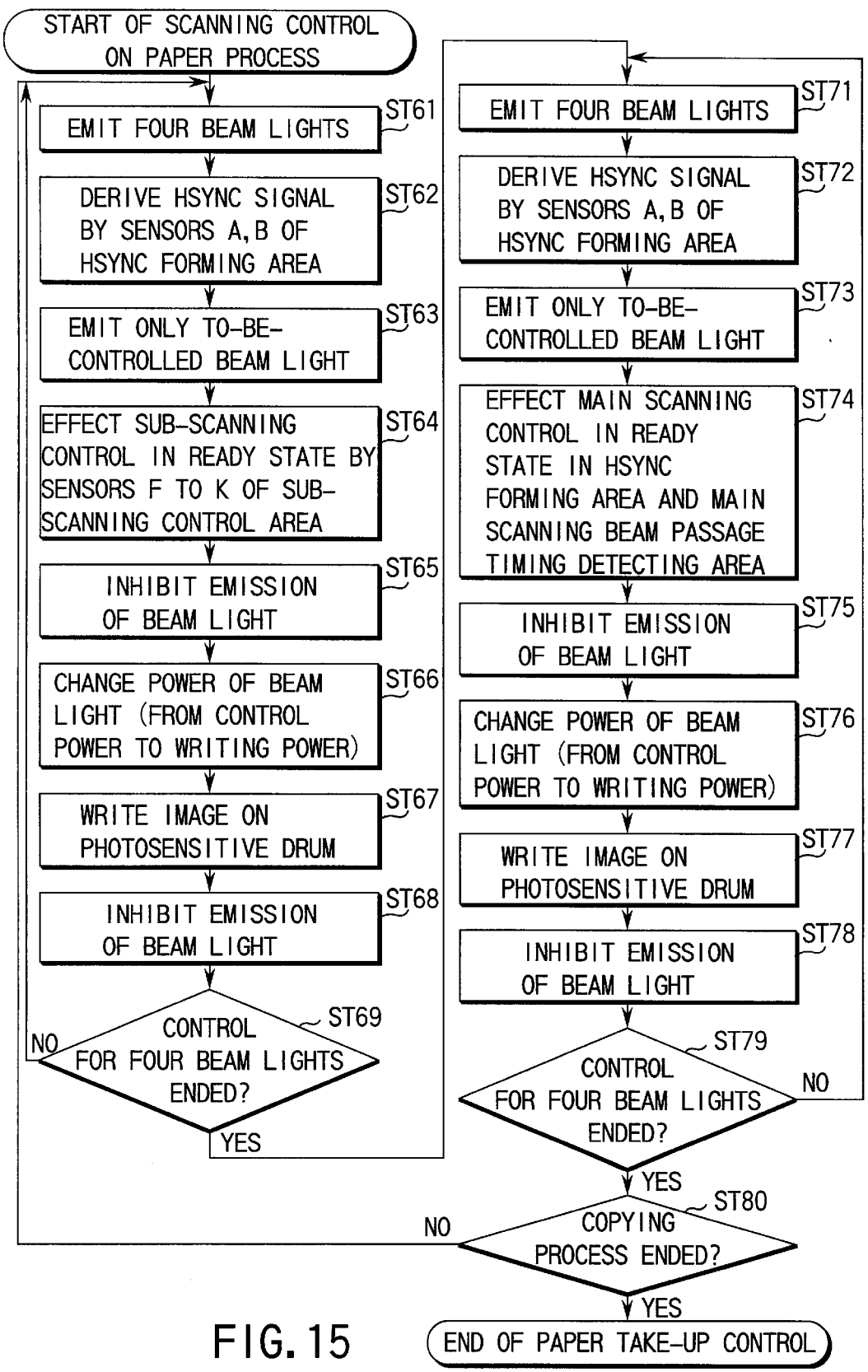
FIG. 15 is a flowchart for illustrating the scanning control on paper process.

The scanning control on paper process (ST53) is explained with reference to the flowchart shown in FIG. 15 and the emission timing of the beam lights at the printing time shown in FIGS. 16A, 16B.

In the scanning control on paper process, the multi-beam control operation is effected by use of the beam light position detecting sensor 38. An HSYNC signal is derived by use of the sensors A, B in the HSYNC forming area on the upstream side of the beam light position detecting sensor 38. The sub-scanning control process in the READY state is effected by use of the sensors F, G, H, I, J, K in the sub-scanning control area on the middle stream side of the beam light position detecting sensor 38.

The main scanning control process in the READY state is effected by using the timing of the HSYNC signal derived by use of the sensors A, B in the HSYNC forming area on the upstream side of the beam light position detecting sensor 38 and the timing of the beam passage derived by use of the sensor P in the main scanning beam passage timing detecting area on the downstream side of the beam light position detecting sensor 38.

That is, in the scanning control on paper process, all of the beam lights are first emitted (ST61) and an HSTNC signal is derived in the HSYNC forming area (ST62). After this, only the beam light to be controlled is emitted (ST63) and the sub-scanning control process in the READY state is effected in the sub-scanning control area (ST64).

Then, after the beam light to be controlled has passed above the surface of the beam light position detecting sensor 38, emission of beam light is inhibited in the beam light emission inhibiting area on the photosensitive drum 15 (ST65) and the power level of the beam light for controlling is changed to the power level of the beam light for writing in the beam light changing area (ST66).

An image is written on the photosensitive drum 15 (ST67) by emitting all of the four beam lights at the power level of the beam light for writing according to image data in the print area. Emission of beam light is inhibited again in the beam light emission inhibiting area (ST68).

The above control process is sequentially effected in an order of a→b→c→d starting from the first beam light a.

After the end of the sub-scanning control process in the READY state for all of the four beam lights (ST69), the main scanning control process in the READY state is started.

Like the sub-scanning control process in the READY state, in the main scanning control process in the READY state, all of the beam lights are emitted (ST71) and an HSTNC signal is derived in the HSYNC forming area (ST72). After this, only the beam light to be controlled is emitted (ST73) and the main scanning control process in the READY state is effected by using the timing of the HSYNC signal derived in the HSYNC forming area and the timing of the beam passage derived in the main scanning beam passage timing detecting area (ST74).

Then, as shown in FIG. 17B, after the beam light to be controlled has passed above the surface of the beam light position detecting sensor 38, emission of beam light is inhibited in the beam light emission inhibiting area on the photosensitive drum 15 (ST75) and the power level of the beam light for controlling is changed to the power level of beam light for writing in the beam changing area (ST76).

An image is written on the photosensitive drum 15 (ST77) by emitting all of the four beam lights at the beam light power level for writing according to image data in the print area. Emission of beam light is inhibited again in the beam light emission inhibiting area (ST78).

The above main scanning control process in the READY state is sequentially effected in an order of a→b→c→d starting from the first beam light a.

After the end of the main scanning control process in the READY state for all of the four beam lights (ST79) the sub-scanning control process in the READY state is started again (ST80). The sub-scanning control process in the READY state and the main scanning control process in the READY state are repeatedly effected until the last copying process is terminated, and if the last copying process is terminated, the control operation is terminated (ST61 to ST80).

As an concrete example of the above case, a case wherein the number of beam lights is four, the printing time for A3, LD is one second, time required for the rotation of one surface of the polygon motor (⅛ rotation) is 403 $\mu$s, and time required for the rotation of eight surfaces of the polygon motor (one rotation) is 3224 $\mu$s (403×8=3224) is explained below.

If the n umber of control operations for controlling one beam light for one second in which the scanning control on paper process is effected when the paper size is A3 or LD is calculated, the control operations of 38 times (1000000/3224×4×4≈38.8) can be effected, and in this embodiment, the control operation is effected by 38 times.

Figure 4:
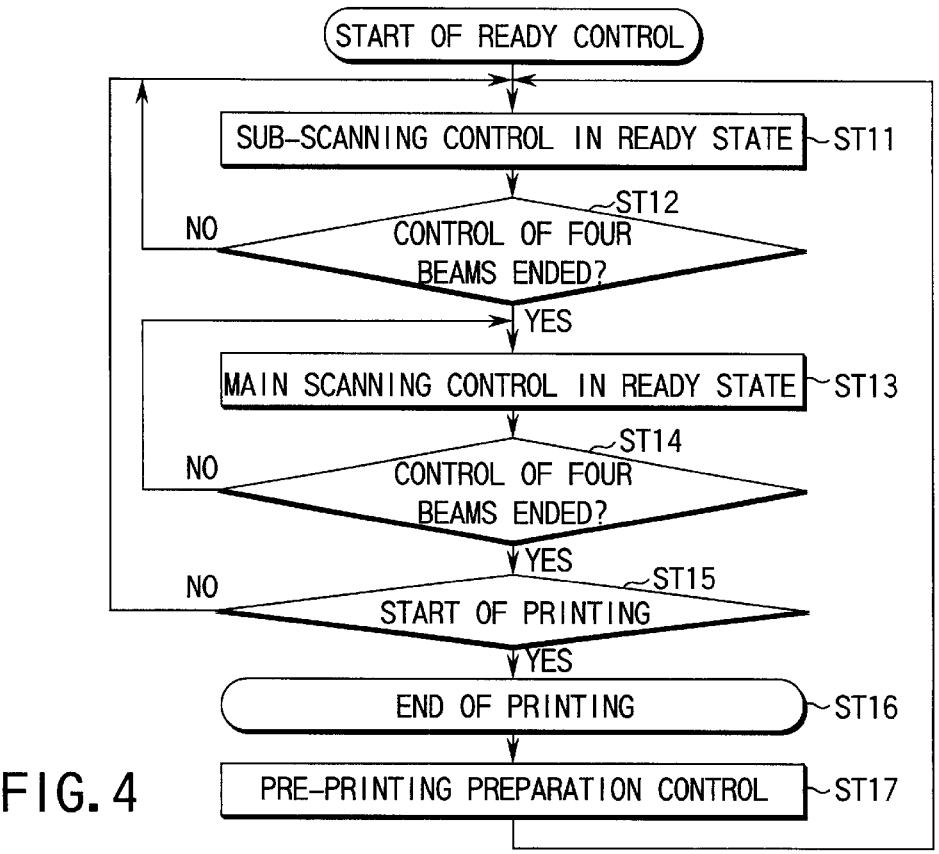
FIG. 4 is a flowchart for illustrating the READY control process.
Figure 5:
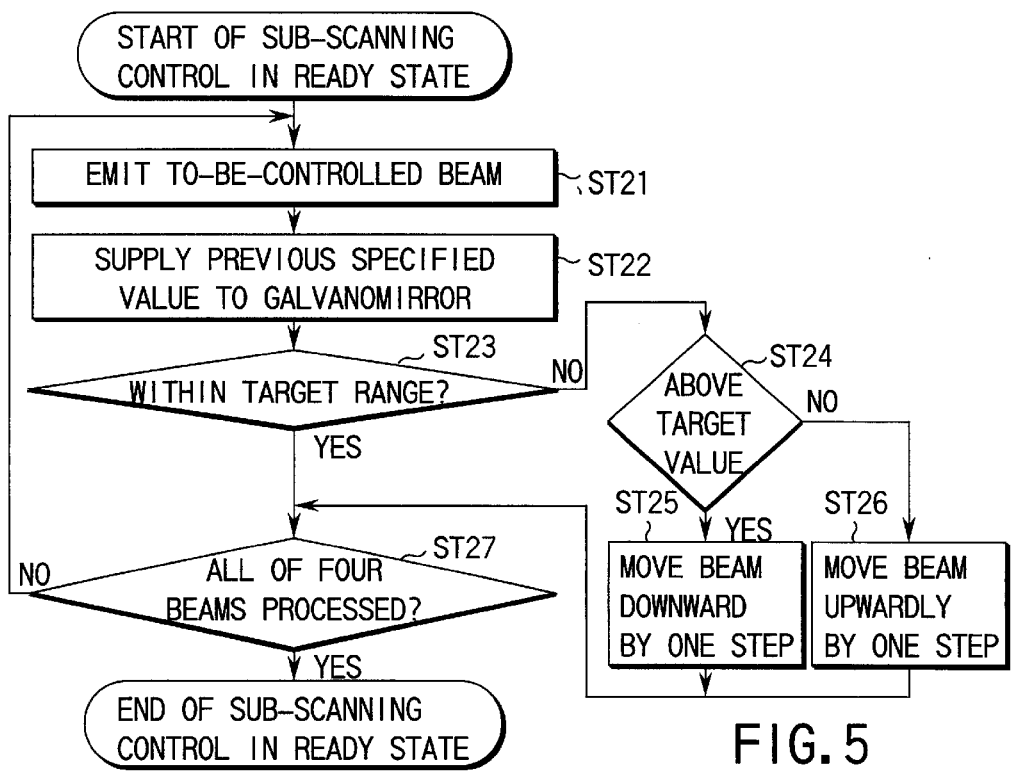
FIG. 5 is a flowchart for illustrating the sub-scanning control process in the READY state.
Figure 6:
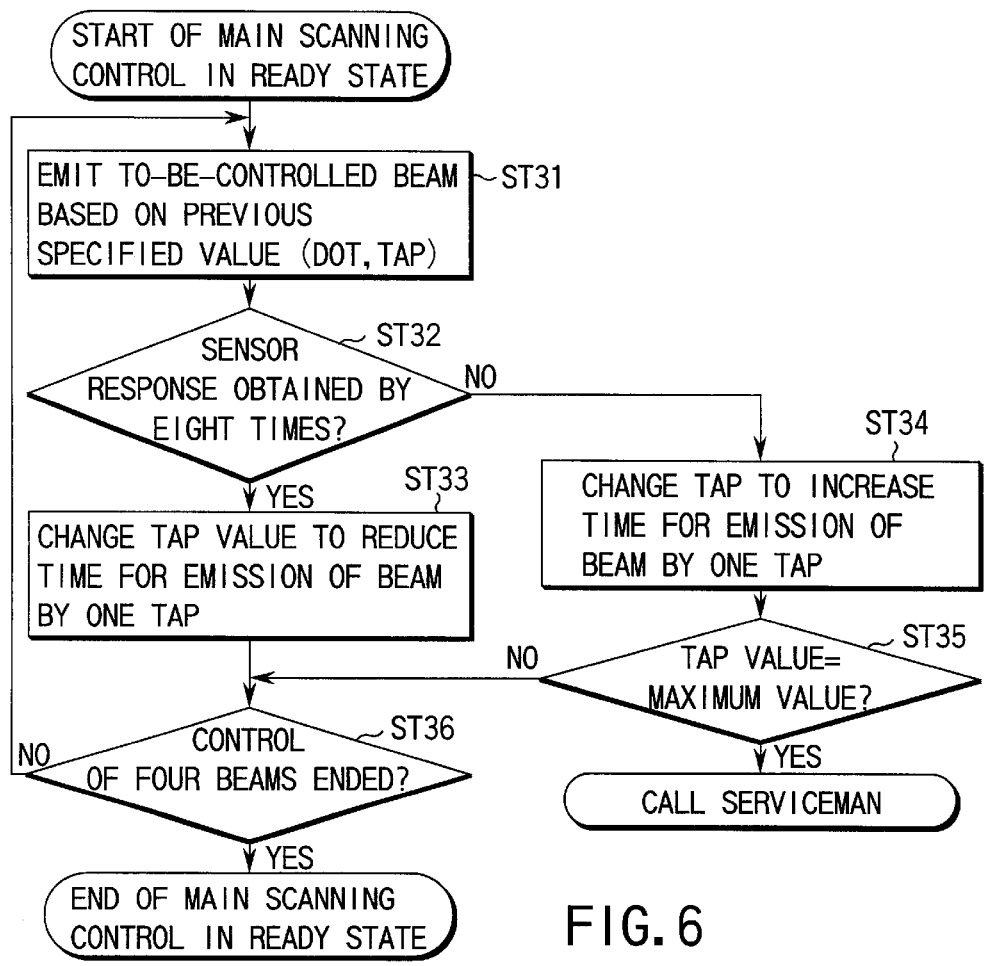
FIG. 6 is a flowchart for illustrating the main scanning control process in the READY state.
Figure 7:
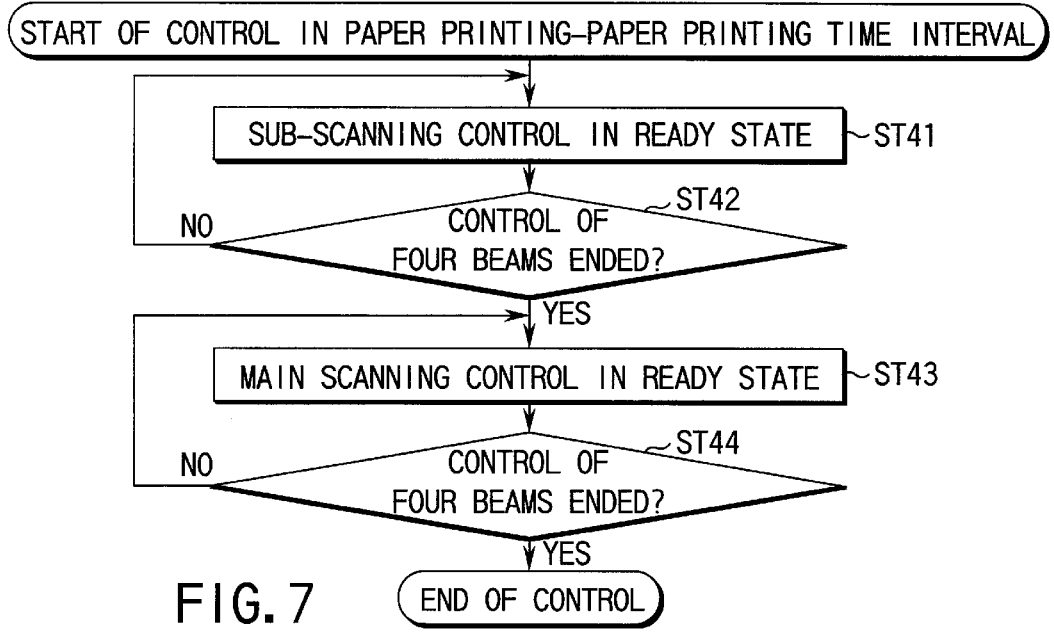
FIG. 7 is a flowchart for illustrating the control process effected in a paper printing-paper printing time interval.
Figures 10, 11:
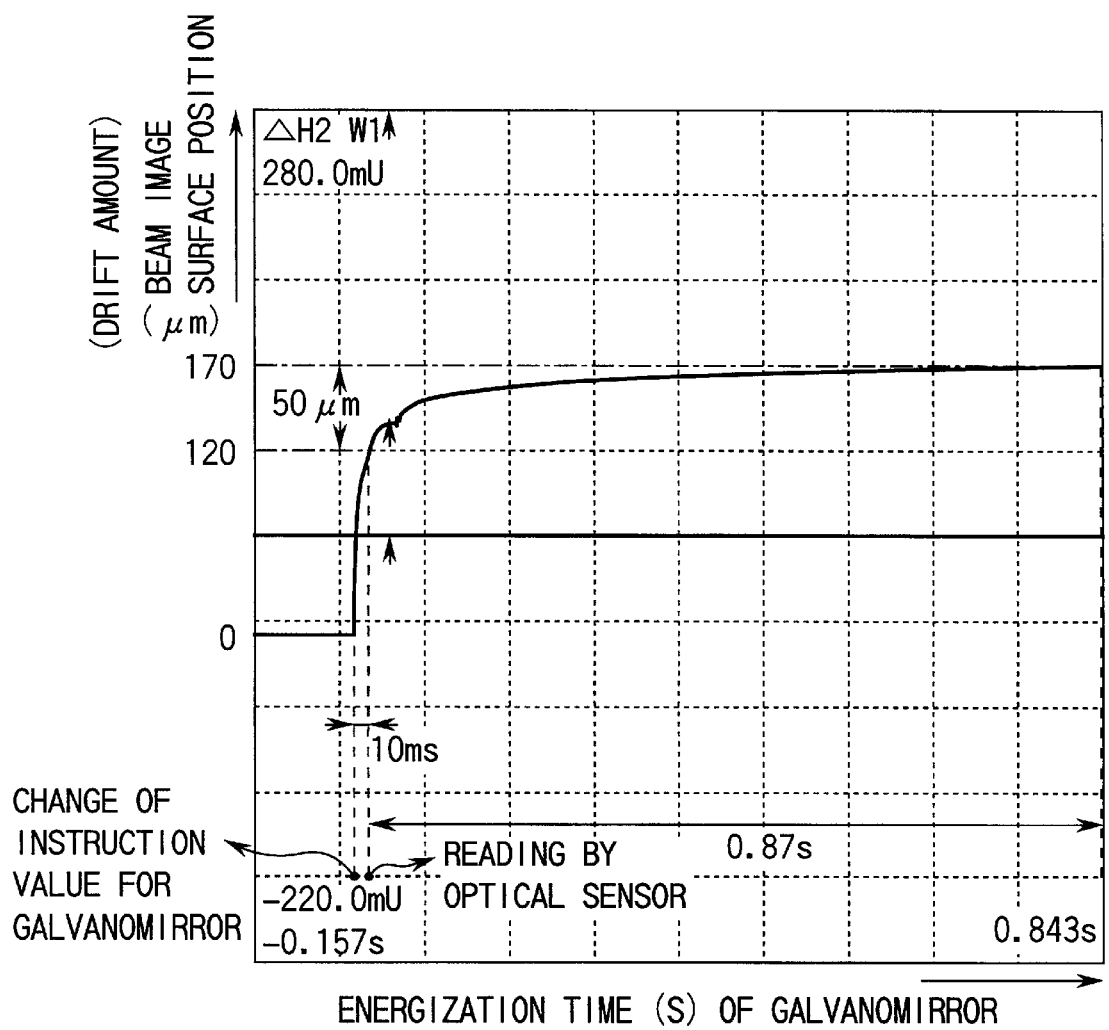
FIG. 10 is a diagram showing a variation in the drift amount according to the energization time of the galvanomirror.
FIG. 11 is a diagram for illustrating the operation specification of the galvanomirror.

One step≈1.76 $\mu$m (refer to FIG. 11) can be corrected in the sub-scanning direction by one control operation and one tap=approx. 1110 dots (≈4.2 $\mu$m) can be corrected in the main scanning direction. Therefore, 66.88 $\mu$m (38×1.76=66.88) can be corrected in the sub-scanning direction by effecting the control operation by 38 times and 159.6 $\mu$m (38×4.2=159.6) can be corrected in the main scanning direction, and thus the deviation amount of 50 $\mu$m of the drift in the worst case can be corrected.

In this example, the READY control operation is explained as an example, but it is possible to effect the scanning control on paper process during the printing process also in a case where the multi-beam control process at the turn-ON time of the power supply and at the end of printing is used.

As described above, the multi-beam control process is effected in the printing process in the same manner as in the READY state in order to prevent occurrence of a problem in an image. The control process is different from the READY control process in that the beam light is emitted on the beam light position detecting sensor in the READY control process and no beam light is emitted on the photosensitive drum as shown in FIGS. 17A, 17B, but in the scanning control on paper process of this invention, the same control operation as the READY control process is effected on the surface of the beam light position detecting sensor, but beam lights are emitted at the beam light power level for writing according to image data in the print area on the photosensitive drum as shown in FIGS. 16A, 16B, and an image is written on the photosensitive drum.

As a result, the multi-beam position control process is effected during the copying operation and the precise multi-beam control process can be effected while suppressing an influence by the drift of the galvanomirror.

What is claimed is:

1. An image forming apparatus for forming an image of one image forming medium on an image carrier by scanning and exposing the image carrier by use of a plurality of beam lights, comprising:

a plurality of beam light generating means for outputting a plurality of beam lights at first power level for controlling and at a second power for writing;

deflecting means for deflecting the plurality of beam lights emitted from said plurality of beam light generating means;

scanning means for reflecting the plurality of beam lights deflected by said deflecting means towards the image carrier to scan the plurality of beam lights on the image carrier;

beam light detecting means disposed near a to-be-scanned position on the image carrier, for outputting a detection signal corresponding to timing in the scanning direction of each beam light scanned by said scanning means, a detection signal corresponding to the power level of each beam light and a detection signal corresponding to a position of each beam light in a direction perpendicular to the scanning direction;

adjusting means for emitting each beam light at the first power level and deriving a horizontal sync. signal from said beam light detecting means when said beam light detecting means is scanned by said scanning means, emitting only a to-be-controlled beam light and adjusting one of the positions of the to-be controlled beam light in a direction perpendicular to the scanning direction and the timing of the to-be-controlled beam light in the scanning direction according to the horizontal sync. signal and detection signals derived from said beam light detecting means; and image forming means for emitting beam lights at the second power level according to an image to be formed when the image carrier is scanned by said scanning means after the adjustment by said adjusting means, scanning and exposing the image carrier to form an image on the image carrier.

2. The image forming apparatus according to claim 1, wherein the adjustment for the position of each beam light in the direction perpendicular to the scanning direction by said adjusting means is effected by moving the deflecting position by said deflecting meams.

3. The image forming apparatus for forming an image of one image forming medium on an image carrier by scanning and exposing the image carrier by use of a plurality of beam lights, comprising:

a plurality of beam light generating means for outputting a plurality of beam lights at a first power level for controlling and at a second power level for writing;

deflecting means for deflecting the plurality of beam lights emitted from said plurality of beam light generating means;

scanning means for reflecting the plurality of beam lights deflected by said deflecting means towards the image carrier to scan the plurality of beam lights on the image carrier;

beam light detecting means disposed near a to-be-scanned position on the image carrier, for outputting a detection signal corresponding to timing in the scanning direction of each beam light scanned by said scanning means, a detection signal corresponding to the power of each beam light and a detection signal corresponding to a position of each beam light in a direction perpendicular to the scanning direction;

adjusting means for emitting each beam light at the first power level and deriving a horizontal sync. signal from said beam light detecting means when said beam light detecting means is scanned by said scanning means, emitting only a to-be-controlled beam light and adjusting one of the position of the to-be-controlled beam light in a direction perpendicular to the scanning direction thereof according to the horizontal sync. signal and detection signals derived from said beam light detecting means;

second adjusting means for emitting each beam light at the first power level and deriving a horizontal sync. signal from said beam light detecting means when said beam light detecting means is scanned by said scanning means, and emitting only a to-be-controlled beam light and adjusting the timing of the to-be-controlled beam light in the scanning direction thereof according to the horizontal sync. signal and detection signals derived from said beam light detecting means; and image forming means for emitting beam lights at the second power level according to an image to be formed when the image carrier is scanned by said scanning means after the adjustment by one of said first and second adjusting means, scanning and exposing the image carrier to form an image on the image carrier.

4. The image forming apparatus according to claim 3, wherein the adjustment for the position of each beam light in the direction perpendicular to the scanning direction by said adjusting means is effected by moving the deflecting position by said deflecting means.

* * * * *